US008838314B2

(12) United States Patent
Bissontz

(10) Patent No.: US 8,838,314 B2
(45) Date of Patent: Sep. 16, 2014

(54) CONTROL SYSTEM FOR EQUIPMENT ON A VEHICLE WITH A HYBRID-ELECTRIC POWERTRAIN AND AN ELECTRONICALLY CONTROLLED COMBINATION VALVE

(75) Inventor: Jay E. Bissontz, Ft. Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/581,550

(22) PCT Filed: Mar. 3, 2010

(86) PCT No.: PCT/US2010/026059

§ 371 (c)(1),
(2), (4) Date: Aug. 28, 2012

(87) PCT Pub. No.: WO2011/109017

PCT Pub. Date: Sep. 9, 2011

(65) Prior Publication Data

US 2012/0323429 A1 Dec. 20, 2012

(51) Int. Cl.
*B60W 20/00* (2006.01)
*B66F 11/04* (2006.01)

(52) U.S. Cl.
CPC .................................... *B66F 11/044* (2013.01)
USPC .................. 701/22; 701/50; 701/54; 701/55; 74/15.82; 60/413; 60/430; 60/464; 60/484; 60/488

(58) Field of Classification Search
CPC ..... B60T 17/02; B60T 8/4031; B60T 17/226; F15B 2211/305525; F15B 2211/40515; F15B 2211/329; F15B 2211/71
USPC ............ 701/22, 50, 51, 55; 60/413, 430, 435; 477/27, 34, 4; 180/165, 243, 306, 53.4, 180/65.22, 65.235
See application file for complete search history.

(56) References Cited

U.S. PATENT DOCUMENTS 3,915,186 A 10/1975 Thomas
5,983,151 A * 11/1999 Okada et al. .................... 701/50
6,231,131 B1 * 5/2001 Dinkel et al. .............. 303/115.4
6,272,402 B1 * 8/2001 Kelwaski .......................... 701/1
7,281,595 B2 10/2007 Bissontz
8,103,395 B2 1/2012 Bissontz
8,219,273 B2 7/2012 Bissontz (Continued)

FOREIGN PATENT DOCUMENTS

EP 2065519 A1 6/2009

*Primary Examiner* — Helal A Algahaim
*Assistant Examiner* — Jelani Smith
(74) *Attorney, Agent, or Firm* — Jeffrey P. Calfa; Mark C. Bach

(57) ABSTRACT

A control system for a hydraulic system comprises an electronic control module, an electronic system controller, a remote power module, and a solenoid valve. The electronic control module monitors torque output of an internal combustion engine, an electric motor and generator. The electronic system controller monitors torque demand of a first and a second hydraulic circuit. The remote power module is in electrical communication with the electronic system controller. The solenoid valve is in electrical communication with the remote power module. The solenoid valve connects to a combination valve and has a first open position and a closed position. The combination valve is in fluid communication with a first hydraulic circuit and a second hydraulic circuit. The solenoid valve moves to the open position in response to an output signal from the electronic system controller.

17 Claims, 10 Drawing Sheets

(56) References Cited

U.S. PATENT DOCUMENTS

2003/0172747 A1 9/2003 Gandrud
2004/0112653 A1* 6/2004 Boggs et al. ................. 180/65.2
2006/0289266 A1 12/2006 Gierer et al.
2007/0062186 A1 3/2007 Wuthrich et al.
2007/0135257 A1 6/2007 Bissontz
2008/0177434 A1 7/2008 Moran
2008/0264189 A1 10/2008 Hancock
2008/0303336 A1* 12/2008 Whitfield et al. ........... 298/17 R
2009/0076690 A1* 3/2009 Guo et al. ....................... 701/51
2009/0118948 A1 5/2009 Heap et al.
2010/0018808 A1* 1/2010 Gloge .......................... 184/6.12
2010/0270095 A1* 10/2010 Shono et al. ............... 180/65.29
2011/0017533 A1 1/2011 Bissontz
2011/0218698 A1 9/2011 Bissontz
2011/0224858 A1 9/2011 Bissontz
2011/0231045 A1 9/2011 Bissontz
2011/0231046 A1 9/2011 Bissontz
2012/0143412 A1 6/2012 Bissontz
2013/0096754 A1* 4/2013 Dalum et al. ................... 701/22

* cited by examiner

CONTROL SYSTEM FOR EQUIPMENT ON A VEHICLE WITH A HYBRID-ELECTRIC POWERTRAIN AND AN ELECTRONICALLY CONTROLLED COMBINATION VALVE

TECHNICAL FIELD

The present disclosure relates to a hydraulic load control system for power take off ("PTO") equipment on a vehicle with a hybrid-electric powertrain, and more particularly to a system and method for controlling a hydraulic combination valve for a hydraulic system on a vehicle with a hybrid-electric powertrain.

BACKGROUND

Many vehicles now utilize hybrid-electric powertrains in order to increase the efficiency of the vehicle. A hybrid-electric powertrain typically involves an internal combustion engine that operates a generator that produces electrical power that may be used to drive electric motors used to move the vehicle. The electric motors may be used to provide power to wheels of the vehicle to move the vehicle, or the electric motors may be used to supplement power provided to the wheels by the internal combustion engine and a transmission. In certain operational situations, the electric motors may supply all of the power to the wheels, such as under low speed operations. In addition to providing power to move the vehicle, the hybrid-electric powertrain may be used to power a PTO of the vehicle, sometimes also referred to as an electric PTO or EPTO when powered by a hybrid-electric powertrain, that in turn powers PTO driven accessories.

In some vehicles, such as utility trucks, for example, a PTO may be used to drive a hydraulic pump for an on-board vehicle hydraulic system. In some configurations, a PTO driven accessory may be powered while the vehicle is moving. In other configurations, a PTO driven accessory may be powered while the vehicle is stationary and the vehicle is being powered by the internal combustion engine. Still others may be driven while the vehicle is either stationary or traveling. Control arrangements are provided for the operator for any type of PTO configuration.

In some PTO applications, the vehicle's particular internal combustion engine may be of a capacity that makes it inefficient as a source of motive power for the PTO application due to the relatively low power demands, or intermittent operation, of the PTO application. Under such circumstances, the hybrid-electric powertrain may power the PTO, that is, use of the electric motor and generator instead of the IC engine to support mechanical PTO, may be employed. Where power demands are low, the electric motor and generator will typically exhibit relatively low parasitic losses compared to an internal combustion engine. Where power demand is intermittent, but a quick response is provided, the electric motor and generator provides such availability without incurring the idling losses of an internal combustion engine.

Many hydraulic systems contain a plurality of hydraulic circuits, such that multiple hydraulically operated components may be present. Each of the plurality of hydraulic circuit typically has a dedicated hydraulic pump to provide hydraulic fluid pressure to the hydraulic circuit. These hydraulic systems typically comprise a combination valve that allows hydraulic fluid from one hydraulic circuit to be diverted to another hydraulic circuit if heavy hydraulic loading conditions are present within one of the circuits. Therefore, if the demand for hydraulic pressure within one of the circuits is more than the hydraulic pump for that circuit is capable of generating, the combination valve will allow hydraulic fluid from a different hydraulic circuit to enter the hydraulic circuit that requires additional hydraulic pressure.

Many times a combination valve will active before a hydraulic circuit actually requires additional hydraulic pressure, and excessive backpressure may be generated in the hydraulic circuit that is having hydraulic fluid from another circuit diverted into it. This excessive backpressure may result in excessive wear or damage to the hydraulic system including the hydraulic pump. Additionally, the premature operation of the combination valve results in additional torque to be supplied to the hydraulic pump of the circuit having hydraulic fluid diverted from it, resulting in additional demand placed on the engine or the electric motor and generator. This is particularly inefficient when the hydraulic circuit receiving hydraulic fluid from another circuit does not require that additional fluid, as the additional power from the engine or the electric motor and generator does not result in any useful work being performed by a hydraulically driven component. Therefore, a need exists for a control system for a hybrid-electric powertrain that evaluates a load on a hydraulic circuit prior to activating a combination valve.

Conventionally, once a hybrid electric vehicle equipped for EPTO enters the EPTO operational mode, the electric motor and generator remains unpowered until an active input or power demand signal is provided. Typically, the power demand signal results from an operator input received through a body mounted switch which is part of data link module. Such a module could be the remote power module described in U.S. Pat. No. 6,272,402 to Kelwaski, the entire disclosure of which is incorporated herein by this reference. The switch passes the power demand signal over a data bus such as a Controller Area Network (CAN) now commonly used to integrate vehicle control functions.

A power demand signal for operation of the traction motor is only one of the possible inputs that could occur and which could be received by a traction motor controller connected to the controller area network of the vehicle. Due to the type, number and complexities of the possible inputs that can be supplied from a data link module added by a truck equipment manufacturer (TEM), as well as from other sources, issues may arise regarding adequate control of the electric motor and generator, particularly during the initial phases of a product's introduction, or during field maintenance, especially if the vehicle has been subject to operator modification or has been damaged. As a result, the traction motor may not operate as expected. In introducing a product, a TEM can find itself in a situation where the data link module cannot provide accurate power demand requests for electric motor and generator operation for EPTO operation due to programming problems, interaction with other vehicle programming, or other architectural problems.

SUMMARY

According to one embodiment, a vehicle having a hybrid-electric powertrain comprises an internal combustion engine, an electric motor and generator, a power take off unit, a first hydraulic circuit, a second hydraulic circuit, a combination valve, a solenoid, and an electronic system controller. The electric motor and generator is connected to the internal combustion engine. The power take off unit is selectively driven by the electric motor and generator. The first hydraulic circuit has a first hydraulic pump mechanically connected to the power take off unit and driven by the power take off unit. The second hydraulic circuit has a second hydraulic pump mechanically connected to the power take off unit and driven by the power take off unit. The combination valve is disposed in fluid communication with the first hydraulic circuit and the second hydraulic circuit. The combination valve has a first open position adapted to allow fluid to flow from the second hydraulic circuit to the first hydraulic circuit and a closed position adapted to prevent fluid flow from the first hydraulic circuit to the second hydraulic circuit. The solenoid connects to the combination valve. The solenoid positions the combination valve between the first open position and the closed position. The electronic system controller is in electrical communication with the solenoid. The electronic system controller generates a control output to the solenoid to position the combination valve. The electronic system controller monitors a torque requirement of the first hydraulic circuit and a torque requirement of the second hydraulic circuit and generates a control output to position the combination valve in the first open position when the torque requirement exceeds a first set point, and generates a control output to position the combination valve in the closed position when the torque requirement falls below a second set point.

According to one process, a method of controlling a position of a combination valve of a hydraulic system having a first hydraulic circuit and a second hydraulic circuit is provided. A torque requirement of a first hydraulically driven device connected to a first hydraulic circuit of a hydraulic system is monitored. Torque generated by at least one power source connected to a hydraulic pump of the first hydraulic circuit is monitored. The method determines if the torque requirement of the hydraulically driven device exceeds a first predetermined set point based upon torque generated by the at least one power source connected to the hydraulic pump of the first hydraulic circuit. A combination valve is positioned to a first open position allowing hydraulic fluid to flow from a second hydraulic circuit to the first hydraulic circuit when the torque requirement of the hydraulically driven device exceeds the first predetermined set point.

According to another embodiment, a control system for a vehicle having a hybrid-electric powertrain comprises an electronic control module, an electronic system controller, a hybrid control module, a remote throttle, and a variable displacement hydraulic pump. The electronic system controller is disposed in electrical communication with the electronic control module. The hybrid control module is disposed in electrical communication with the electronic control module and the electronic system controller. The remote throttle is disposed in electrical communication with the electronic control module. The variable displacement hydraulic pump has a displacement adjustment portion disposed in electrical communication with the electronic system controller. The variable displacement portion has at least a first position and a second position. Wherein the variable displacement portion is moved from the first position to the second position in response to an output signal from the electronic system controller.

According to another embodiment, a control system for a combination valve for a hydraulic system of a vehicle having a hybrid-electric powertrain comprises an electronic control module, an electronic system controller, a remote power module, and a solenoid valve. The electronic control module is adapted to monitor torque output of an internal combustion engine and an electric motor and generator. The electronic system controller is disposed in electrical communication with the electronic control module. The electronic system controller is adapted to monitor torque demand of a first hydraulic circuit of a hydraulic system and a second hydraulic circuit of the hydraulic system. The remote power module is disposed in electrical communication with the electronic system controller. The solenoid valve is disposed in electrical communication with the remote power module. The solenoid valve connects to a combination valve. The solenoid valve has a first open position and a closed position. The combination valve is disposed in fluid communication with a first hydraulic circuit and a second hydraulic circuit. The solenoid valve is moved to the first open position in response to an output signal from the electronic system controller when the difference between the torque output and the torque demand of the first hydraulic circuit reaches a first predetermined set point.

DETAILED DESCRIPTION

Figure 1:
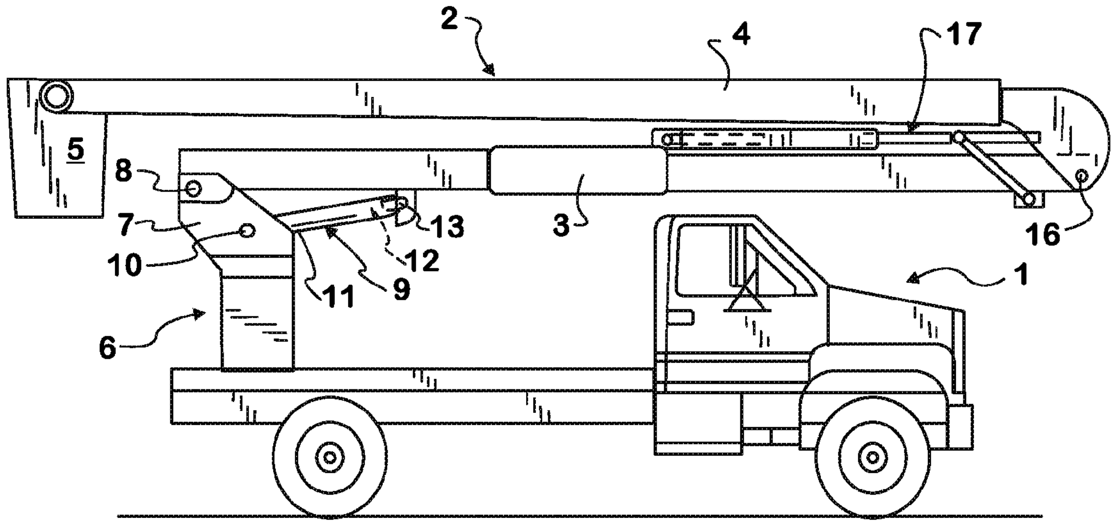
FIG. 1 is a side elevation of a vehicle equipped for a power take-off operation.

Referring now to the figures and in particular to FIG. 1, a hybrid mobile aerial lift truck 1 is illustrated. Hybrid mobile aerial lift truck 1 serves as an example of a medium duty vehicle which supports a PTO vocation, or an EPTO vocation. It is to be noted that embodiments described herein, possibly with appropriate modifications, may be used with any suitable vehicle. Additional information regarding hybrid powertrains may be found in U.S. Pat. No. 7,281,595 entitled "System For Integrating Body Equipment With a Vehicle Hybrid Powertrain," which is assigned to the assignee of the present application and which is fully incorporated herein by reference.

The mobile aerial lift truck 1 includes a PTO load, here an aerial lift unit 2 mounted to a bed on a back portion of the truck 1. During configuration for EPTO operation, the transmission for mobile aerial lift truck 1 may be placed in park, the park brake may be set, outriggers may be deployed to stabilize the vehicle, and indication from an onboard network that vehicle speed is less than 5 kph may be received before the vehicle enters PTO mode. For other types of vehicles, different indications may indicate readiness for PTO operation, which may or may not involve stopping the vehicle.

The aerial lift unit 2 includes a lower boom 3 and an upper boom 4 pivotally connected to each other. The lower boom 3 is in turn mounted to rotate on the truck bed on a support 6 and rotatable support bracket 7. The rotatable support bracket 7 includes a pivoting mount 8 for one end of lower boom 3. A bucket 5 is secured to the free end of upper boom 4 and supports personnel during lifting of the bucket to and support of the bucket within a work area. Bucket 5 is pivotally attached to the free end of boom 4 to maintain a horizontal orientation. A lifting unit 9 is connected between bracket 7 and the lower boom 3. A pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to a pressurized supply of a suitable hydraulic fluid, which allows the assembly to be lifted and lowered. A source of pressurized hydraulic fluid may be an automatic transmission or a separate pump. The outer end of the lower boom 3 is connected to the lower and pivot end of the upper boom 4. A pivot 16 interconnects the outer end of the lower boom 3 to the pivot end of the upper boom 4. An upper boom compensating cylinder unit or assembly 17 is connected between the lower boom 3 and the upper boom 4 for moving the upper boom about pivot 16 to position the upper boom relative to the lower boom 3. The upper-boom, compensating cylinder unit 17 allows independent movement of the upper boom 4 relative to lower boom 3 and provides compensating motion between the booms to raise the upper boom with the lower boom. Unit 17 is supplied with pressurized hydraulic fluid from the same source as unit 9.

Figure 2:
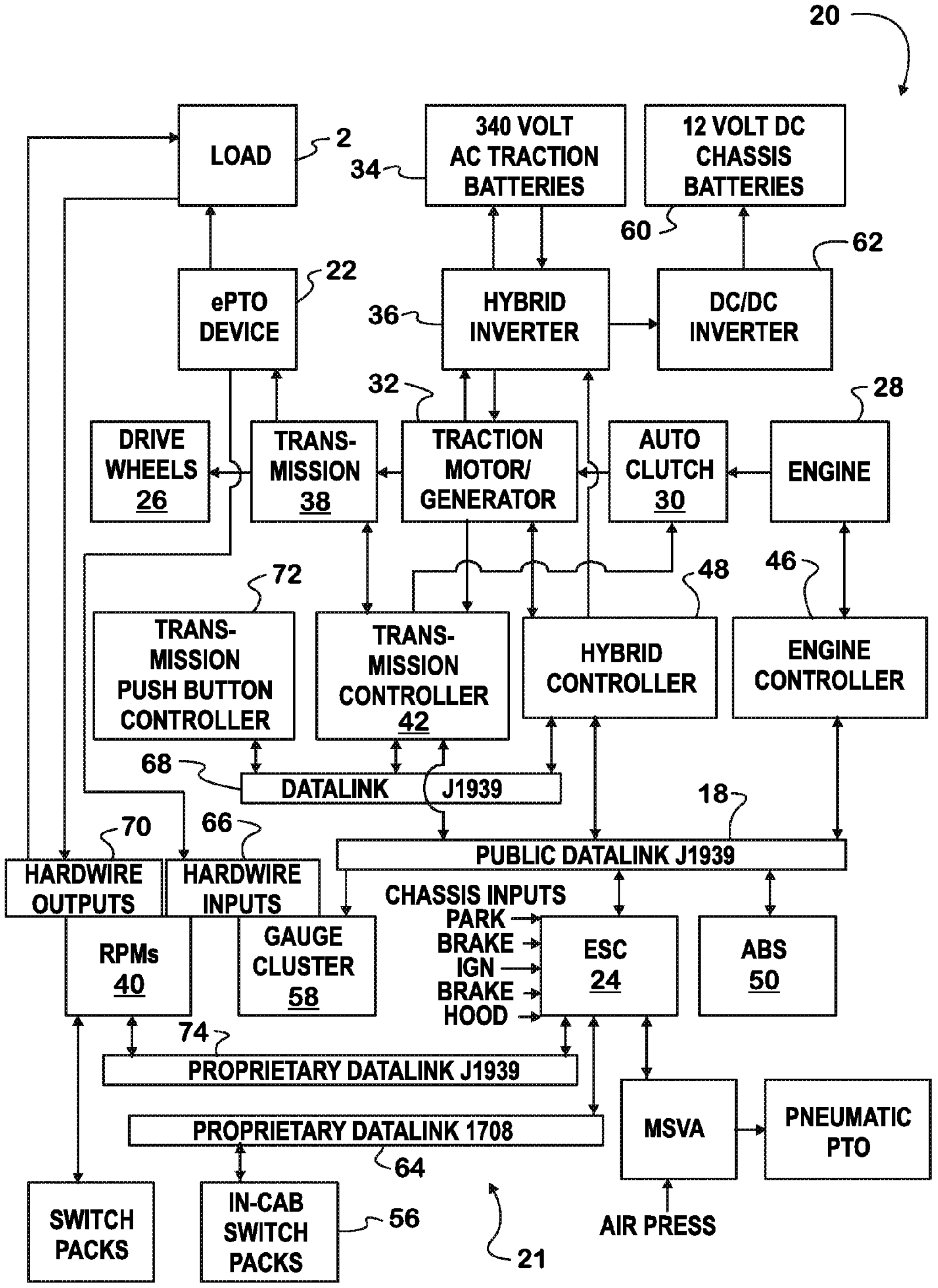
FIG. 2 is a high level block diagram of a control system for the vehicle of FIG. 1.

Referring to FIG. 2, a high level schematic of a control system 21 representative of a system usable with vehicle 1 control is illustrated. An electrical system controller 24, a type of a body computer, is linked by a public data link 18 (here illustrated as an SAE compliant J1939 CAN bus) to a variety of local controllers which in turn implement direct control over most vehicle 1 functions. Electrical system controller ("ESC") 24 may also be directly connected to selected inputs and outputs and other busses. Direct "chassis inputs" include an ignition switch input, a brake pedal position input, a hood position input and a park brake position sensor, which are connected to supply signals to the ESC 24. Other inputs to ESC 24 may exist. Signals for PTO operational control from within a cab may be implemented using an in-cab switch pack(s) 56. In-cab switch pack 56 is connected to ESC 24 over a proprietary data link 64 conforming to the SAE J1708 standard. Data link 64 is a low baud rate data connection, typically on the order of 9.7 Kbaud. Five controllers in addition to the ESC 24 are illustrated connected to the public data link 18. These controllers are the engine controller ("ECM") 46, the transmission controller 42, a gauge cluster controller 58, a hybrid controller 48 and an antilock brake system ("ABS") controller 50. Other controllers may exist on a given vehicle. Data link 18 is the bus for a public controller area network ("CAN") conforming to the SAE J1939 standard and under current practice supports data transmission at up to 250 Kbaud. It will be understood that other controllers may be installed on the vehicle 1 in communication with data link 18. ABS controller 50, as is conventional, controls application of brakes 52 and receives wheel speed sensor signals from sensors 54. Wheel speed is reported over data link 18 and is monitored by transmission controller 42.

Vehicle 1 is illustrated as a parallel hybrid electric vehicle which utilizes a powertrain 20 in which the output of either an internal combustion engine 28, an electric motor and generator 32, or both, may be coupled to the drive wheels 26. Internal combustion engine 28 may be a diesel engine. As with other full hybrid systems, the system is intended to recapture the vehicle's inertial momentum during braking or slowing. The electric motor and generator 32 is run as a generator from the wheels, and the generated electricity is stored in batteries during braking or slowing. Later the stored electrical power can be used to run the electric motor and generator 32 instead of or to supplement the internal combustion engine 28 to extend the range of the vehicle's conventional fuel supply. Powertrain 20 is a particular variation of hybrid design which provides support for PTO either from internal combustion engine 28 or from the electric motor and generator 32. When the internal combustion engine 28 is used for PTO it can be run at an efficient power output level and used to concurrently support PTO operation and to run the electric motor and generator 32 in its generator mode to recharge the traction batteries 34. Usually a PTO application consumes less power than power output at a thermally efficient internal combustion engine 28 throttle setting.

The electric motor and generator 32 is used to recapture the vehicle's kinetic energy during deceleration by using the drive wheels 26 to drive the electric motor and generator 32. At such times auto-clutch 30 disconnects the engine 28 from the electric motor and generator 32. Engine 28 may be utilized to supply power to both generate electricity and operate PTO system 22, to provide motive power to drive wheels 26, or to provide motive power and to run a generator to generate electricity. Where the PTO system 22 is an aerial lift unit 2, it is unlikely that it would be operated when the vehicle was in motion, and the description here assumes that in fact the vehicle will be stopped for EPTO, but other PTO applications may exist where this is not done.

Powertrain 20 provides for the recapture of kinetic energy in response to the electric motor and generator 32 being back driven by the vehicle's kinetic force. The transitions between positive and negative traction motor contribution are detected and managed by a hybrid controller 48. Electric motor and generator 32, during braking, generates electricity which is applied to traction batteries 34 through inverter 36. Hybrid controller 48 looks at the ABS controller 50 data link traffic to determine if regenerative kinetic braking would increase or enhance a wheel slippage condition if regenerative braking were initiated. Transmission controller 42 detects related data traffic on data link 18 and translates these data as control signals for application to hybrid controller 48 over data link 68. Electric motor and generator 32, during braking, generates electricity which is applied to the traction batteries 34 through hybrid inverter 36. Some electrical power may be diverted from hybrid inverter to maintain the charge of a conventional 12-volt DC Chassis battery 60 through a voltage step down DC/DC inverter 62.

Traction batteries may be the only electrical power storage system for vehicle 1. In vehicles contemporary to the writing of this application, numerous 12-volt applications remain in common use and vehicle 1 may be equipped with a parallel 12-volt system to support the vehicle. This possible parallel system is not shown for the sake of simplicity of illustration. Inclusion of such a parallel system would allow the use of readily available and inexpensive components designed for motor vehicle use, such as incandescent bulbs for illumination. However, using 12-volt components may incur a vehicle weight penalty and involve extra complexity.

Electric motor and generator 32 may be used to propel vehicle 1 by drawing power from battery 34 through inverter 36, which supplies 3 phase 340 volt rms power. Battery 34 is sometimes referred to as the traction battery to distinguish it from a secondary 12-volt lead acid battery 60 used to supply power to various vehicle systems. However, high mass utility vehicles tend to exhibit far poorer gains from hybrid locomotion than do automobiles. Thus, stored electrical power is also used to power the EPTO system 22. In addition, electric motor and generator 32 is used for starting engine 28 when the ignition is in the start position. Under some circumstances, engine 28 is used to drive the electric motor and generator 32 with the transmission 38 in a neutral state to generate electricity for recharging battery 34 and/or engaged to the PTO system 22 to generate electricity for recharging the battery 34 and operate the PTO system 22. This would occur in response to heavy PTO system 22 use which draws down the charge on battery 34. Typically, engine 28 has a far greater output capacity than is used for operating PTO system 22. As a result, using it to directly run PTO system 22 full time would be highly inefficient due to parasitic losses incurred in the engine or idling losses which would occur if operation were intermittent. Greater efficiency is obtained by running engine 22 at close to its rated output to recharge battery 34 and provide power to the PTO, and then shutting down the engine and using battery 34 to supply electricity to electric motor and generator 32 to operate PTO system 22.

An aerial lift unit 2 is an example of a system which may be used only sporadically by a worker first to raise and later to reposition its basket 5. Operating the aerial lift unit 2 using the traction motor 32 avoids idling of engine 28. Engine 28 runs periodically at an efficient speed to recharge the battery 34 if battery 34 is in a state of relative discharge. Battery 34 state of charge is determined by the hybrid controller 48, which passes this information to transmission controller 42 over data link 68. Transmission controller 42 can in turn request ESC 24 to engage engine 28 by a message to the ESC 24, which in turn sends engine operation requests (i.e. engine start and stop signals) to ECM 46. The availability of engine 28 may depend on certain programmed (or hardwired) interlocks, such as hood position.

Powertrain 20 comprises an engine 28 connected in line with an auto clutch 30 which allows disconnection of the engine 28 from the rest of the powertrain when the engine is not being used for motive power or for recharging battery 34. Auto clutch 30 is directly coupled to the electric motor and generator 32 which in turn is connected to a transmission 38. Transmission 38 is in turn used to apply power from the electric motor and generator 32 to either the PTO system 22 or to drive wheels 26. Transmission 38 is bi-directional and can be used to transmit energy from the drive wheels 26 back to the electric motor and generator 32. Electric motor and generator 32 may be used to provide motive energy (either alone or in cooperation with the engine 28) to transmission 38. When used as a generator, the electric motor and generator 32 supplies electricity to inverter 36 which supplies direct current for recharging battery 34.

A control system 21 implements cooperation of the control elements for the operations just described. ESC 24 receives inputs relating to throttle position, brake pedal position, ignition state and PTO inputs from a user and passes these to the transmission controller 42 which in turn passes the signals to the hybrid controller 48. Hybrid controller 48 determines, based on available battery charge state, whether the internal combustion engine 28 or the traction motor 32 satisfies requests for power. Hybrid controller 48 with ESC 24 generates the appropriate signals for application to data link 18 for instructing the ECM 46 to turn engine 28 on and off, and if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to a hydraulic pump which is part of PTO system 22 (or simply pressurized hydraulic fluid to PTO system 22 where transmission 38 serves as the hydraulic pump) or if the transmission is to be in neutral. For purposes of illustration only, a vehicle may come equipped with more than one PTO system, and a secondary pneumatic system using a multi-solenoid valve assembly 85 and pneumatic PTO device 87 is shown under the direct control of ESC 24.

PTO 22 control is conventionally implemented through one or more remote power modules (RPMs). Remote power modules are data-linked expansion input/output modules dedicated to the ESC 24, which is programmed to utilize them. Where RPMs 40 function as the PTO controller they can be configured to provide hardwire outputs 70 and hardwire inputs used by the PTO device 22 and to and from the load/aerial lift unit 2. Requests for movement from the aerial lift unit 2 and position reports are applied to the proprietary data link 74 for transmission to the ESC 24, which translates them into specific requests for the other controllers, e.g. a request for PTO power. ESC 24 is also programmed to control valve states through RPMs 40 in PTO device 22. Remote power modules are more fully described in U.S. Pat. No. 6,272,402, which is assigned to the assignee of the present application and which is fully incorporated herein by reference. At the time the ’402 patent was written, what are now termed “Remote Power Modules” were called “Remote Interface Modules.” It is contemplated that the TEMs who provide the PTO vocation will order or equip a vehicle with RPMs 40 to support the PTO and supply a switch pack 57 for connection to the RPM 40. TEMs are colloquially known as “body builders” and signals from an RPM 40 provided for body builder supplied vehicle vocations are termed “body power demand signals”.

Body power demand signals may be subject to corruption, vehicle damage or architectural conflicts over the vehicle controller area network. Accordingly, an alternative mechanism is provided to generate power demand signals for the PTO from the vehicle’s conventional control network. A way of providing for operator initiation of such a power demand signal without use of RPM 40 is to use the vehicle’s conventional controls including controls which give rise to what are termed “chassis inputs.” Power demand signals for PTO operation originating from such alternative mechanisms are termed “chassis power demand signals”. An example of such could be flashing the headlamps twice while applying the parking brake, or some other easy to remember, but seemingly idiosyncratic control usage, so long as the control choice does not involve the PTO dedicated RPM 40.

Transmission controller and ESC 24 both operate as portals and/or translation devices between the various data links. Proprietary data links 68 and 74 operate at substantially higher baud rates than does the public data link 18, and accordingly, buffering is provided for a message passed from one link to another. Additionally, a message may be reformatted, or a message on one link may be changed to another type of message on the second link, e.g. a movement request over data link 74 may translate to a request for transmission engagement from ESC 24 to transmission controller 42. Data links 18, 68 and 74 are all controller area networks and conform to the SAE J1939 protocol. Data link 64 conforms to the SAE J1708 protocol.

Figure 3:
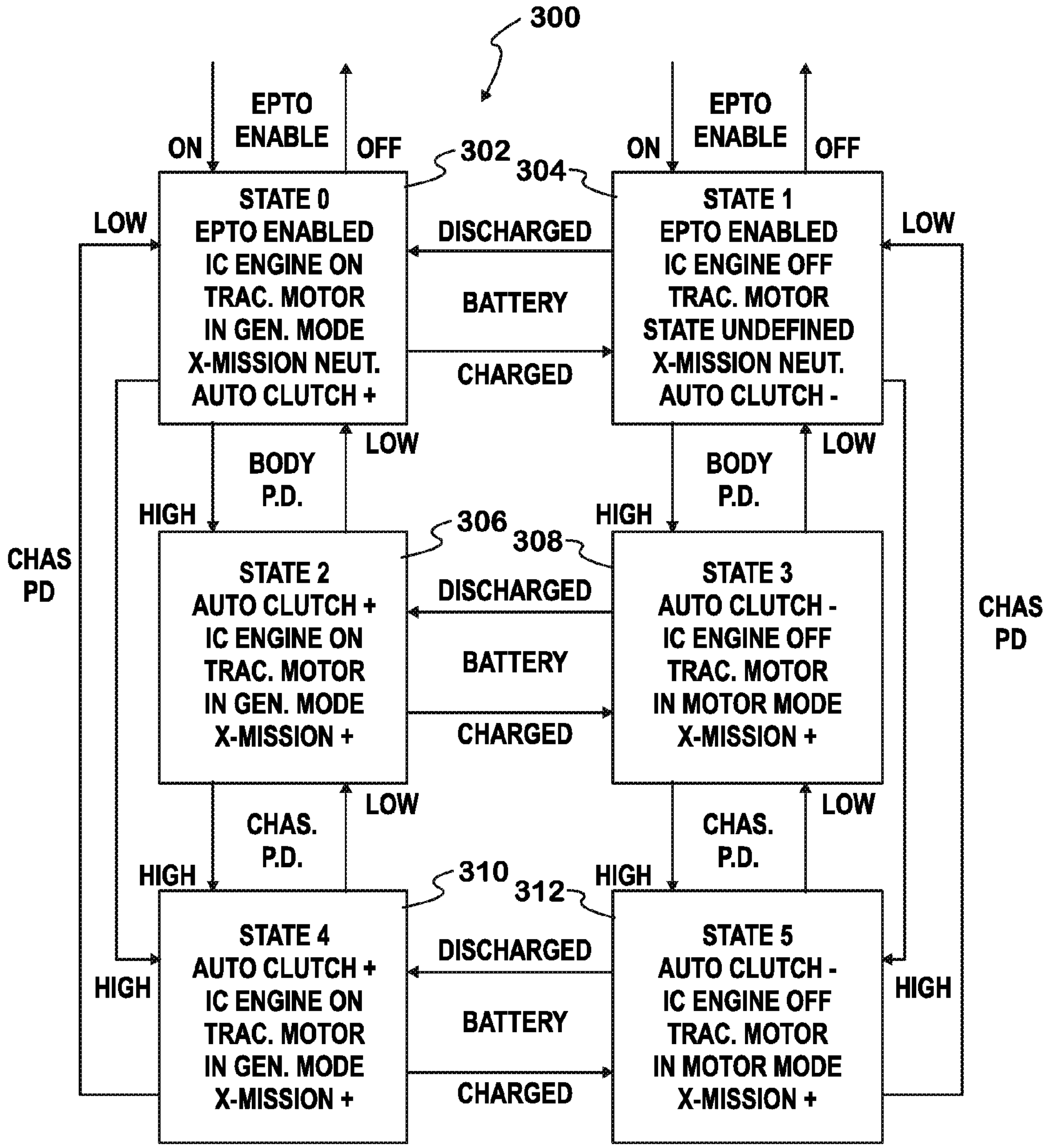
FIG. 3 is a diagram for a state machine relating to a power take-off operation which can be implemented on the control system of FIG. 2.

Referring to FIG. 3 a representative state machine 300 is used to illustrate one possible control regime. State machine 300 is entered through either of two EPTO enabled states 300, 302, depending upon whether engine 28 is operating to recharge the traction batteries 34 or not. In the EPTO enabled state, the conditions triggering EPTO operation have been met, but the actual PTO vocation is not powered. Depending upon the state of charge of the traction batteries 34, engine 28 may be operating (state 302) or may not be running (state 304). In any state where the engine 28 is on, the auto clutch 30 is engaged (+). The state of charge which initiates battery charging is less than the state of charge at which charging is discontinued to prevent frequent cycling of the engine 28 on and off. The EPTO enabled states (302, 304) provide that the transmission 38 is disengaged. In state 302 where batteries 34 are being charged, the electric motor and generator 32 is in its generator mode. In state 304 where batteries 34 are considered charged, the state of the electric motor and generator 32 need not be defined and may be left in its prior state.

Four EPTO operating states, 306, 308, 310 and 312 are defined. These states occur in response to either a body power demand or chassis power demand. Within, PTO vehicle battery charging continues to function. State 306 provides that the engine 28 be on, the auto clutch 30 be engaged, the electric motor and generator 32 be in its generator mode and the transmission be in gear for PTO. In state 308 the engine 28 is off, the auto clutch 30 is disengaged, the traction motor is in its motor mode and running and the transmission 38 be in gear for PTO. States 306 and 308, as a class, are exited upon loss of the body power demand signal (which may occur as a result of cancellation of PTO enable) or upon or occurrence of a chassis power demand signal. Changes in state stemming from the battery state of charge can force changes within the class between states 306 and 308. EPTO operating states 310 and 312 are identical to states 306 and 308, respectively, except that loss of the body power demand signal does not result in one of states 310, 312 being exited. Only loss of the chassis power demand signal results in exit from EPTO operating states 310 or 312, taken as a class, although transitions within the class (i.e. between 310 and 312) can result from the battery state of charge. Upon loss of a chassis power demand signal, the exit route from states 310, 312, depends upon whether a body power demand signal is present. If it is, the operational state moves from states 310 or 312 to states 306 or 308, respectively. If it is not, then to states 302 or 304. If the body power demand signal was lost due to exit from the EPTO enable conditions than states 302 or 304 are exited along the "OFF" routes. For transitions within a class, particularly from an engine 28 off to an engine 28 on state, an intermediary state may be provided where the auto-clutch 30 is engaged to permit the traction motor to crank the engine.

Figure 4A:
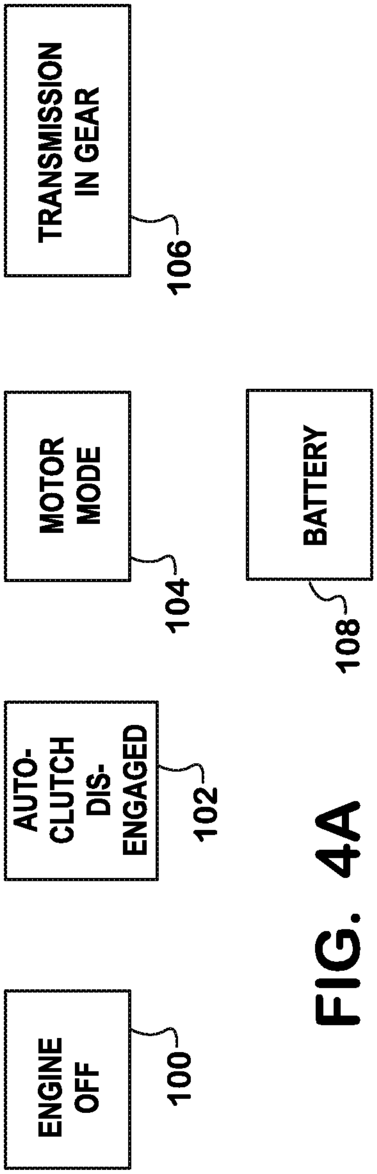
FIGS. 4A-D are schematic illustrations of a hybrid powertrain applied to support a power take-off operation.
Figure 4B:
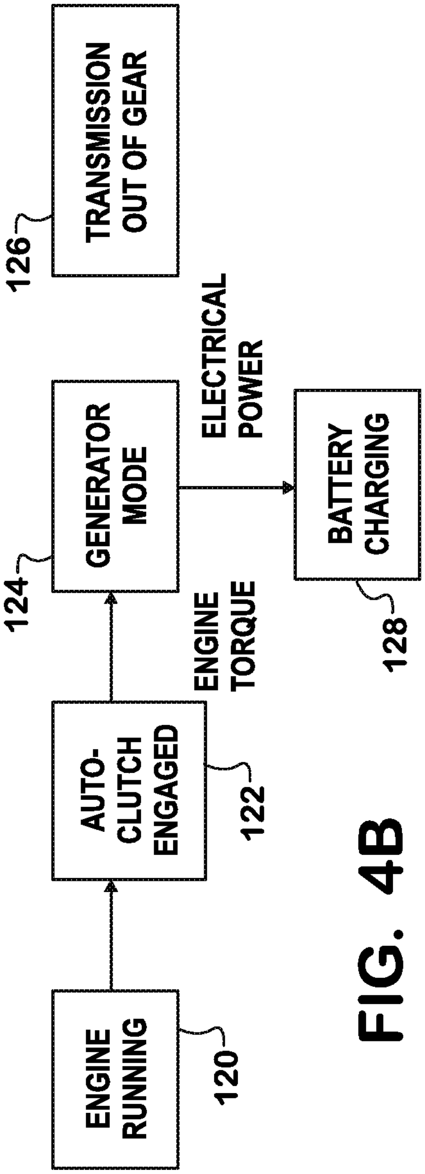
Figure 4C:
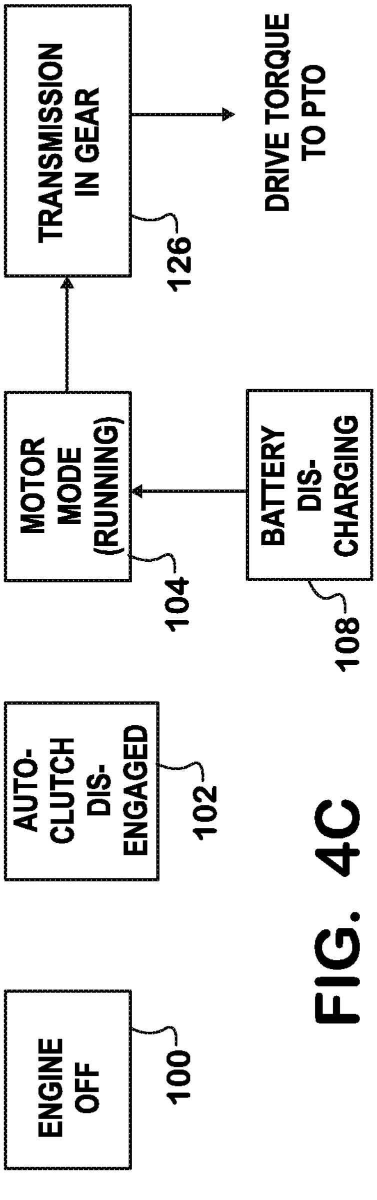

FIGS. 4A-D illustrate graphically what occurs on the vehicle in the various states of the state machine implemented through appropriate programming of the ESC 24. FIG. 4A corresponds to state 304, one of the EPTO enabled state. FIG. 4B corresponds to state 302, the other EPTO enabled state. FIG. 4C corresponds to states 308 and 312, while FIG. 4D corresponds to states 306 and 310. In FIG. 4A the IC engine 28 is off (state 100), the auto clutch is disengaged (state 102), the electric motor and generator 32 state may be undefined, but is shown as being motor mode (104). With electric motor and generator 32 in the motor mode, the battery is shown in a discharge ready state 108. The transmission is shown as in gear (106), though this is elective. In FIG. 4B, battery charging 128 is occurring as a result of the IC engine running 120, the auto clutch being engaged 122 with engine torque being applied through the auto clutch to the electric motor and generator 32 operating in its generator mode 124. The transmission is out of gear 126.

Figure 4D:
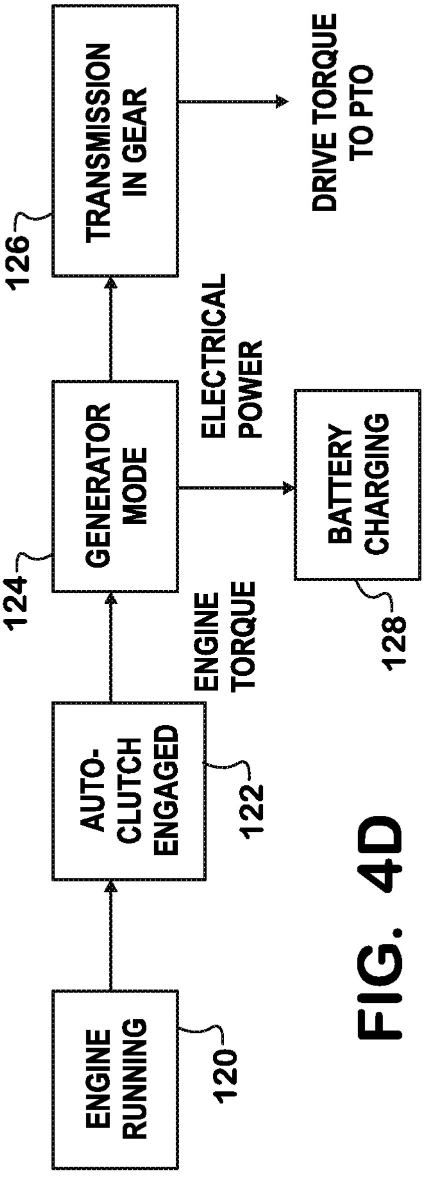

FIG. 4C corresponds to state machine 300 states 308 and 312 with the engine 28 being off 100, the auto clutch 30 being disengaged 102. The battery 34 is discharging 108 to operate the traction motor in its running state 104 to apply torque to the transmission 38 which is in gear 126 to apply drive torque to the PTO. FIG. 4D corresponds to state machine 300 states 306 and 310. The IC engine 28 is running 120 to supply power through an engaged 122 auto clutch to operate the electric motor and generator 32 in its generator mode to supply electrical power to a charging (128) battery and to supply torque through the transmission to the PTO application.

Figure 5:
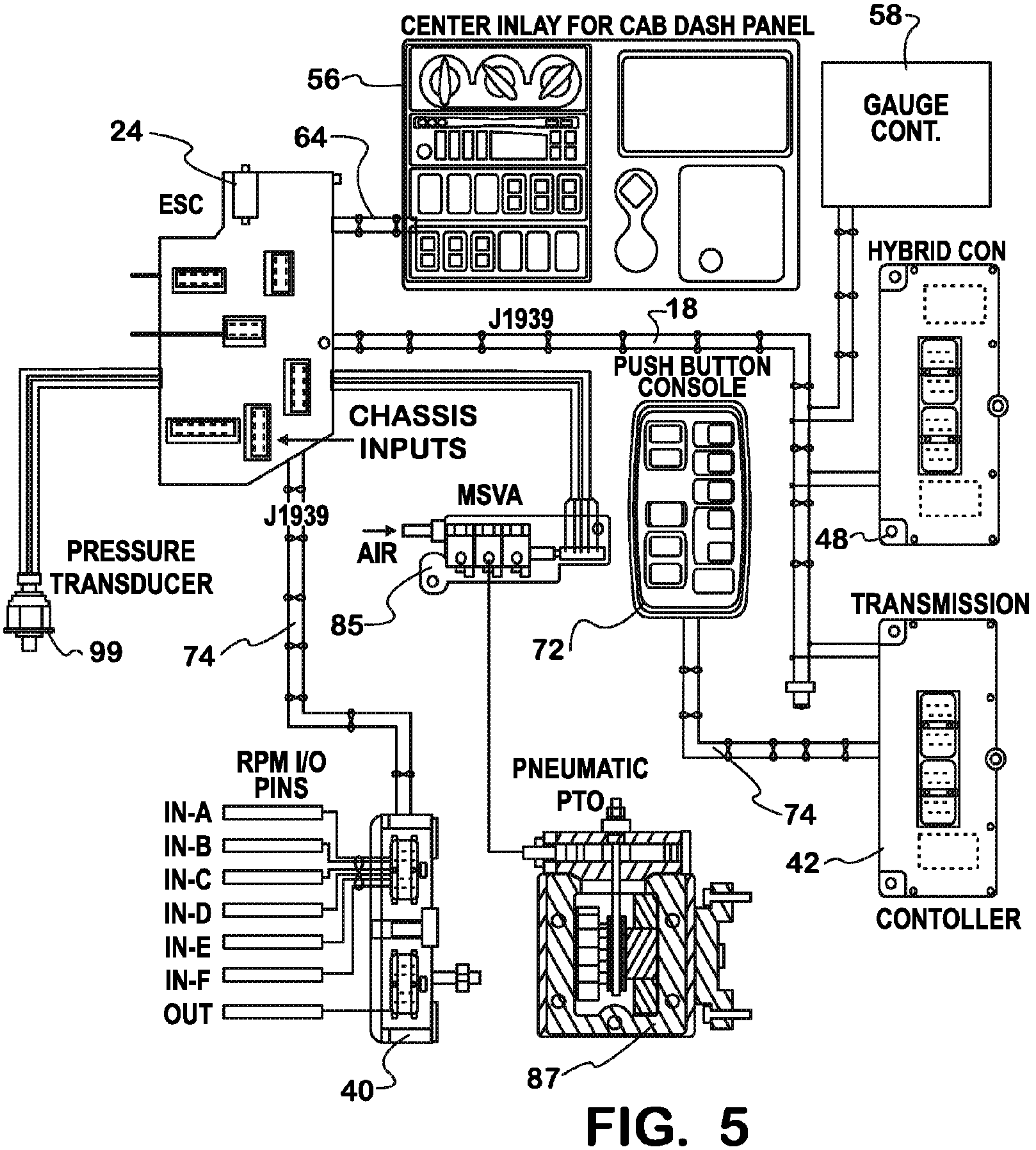
FIG. 5 is a system diagram for chassis and body initiated hybrid electric motor and generator control for power take-off operation.
Figure 6:
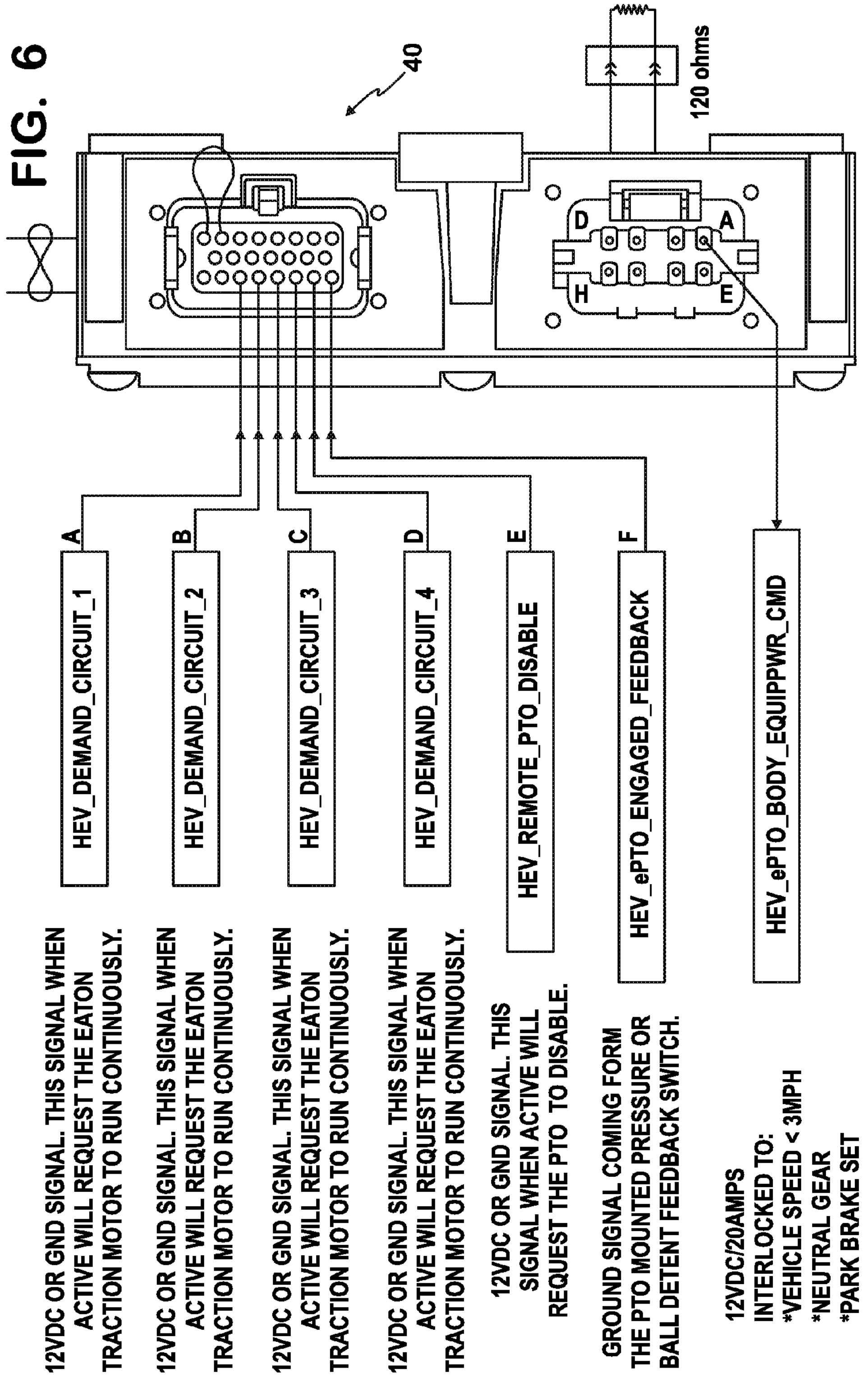
FIG. 6 is a map of input and output pin connections for a remote power module in the system diagram of FIG. 5.
Figure 7:
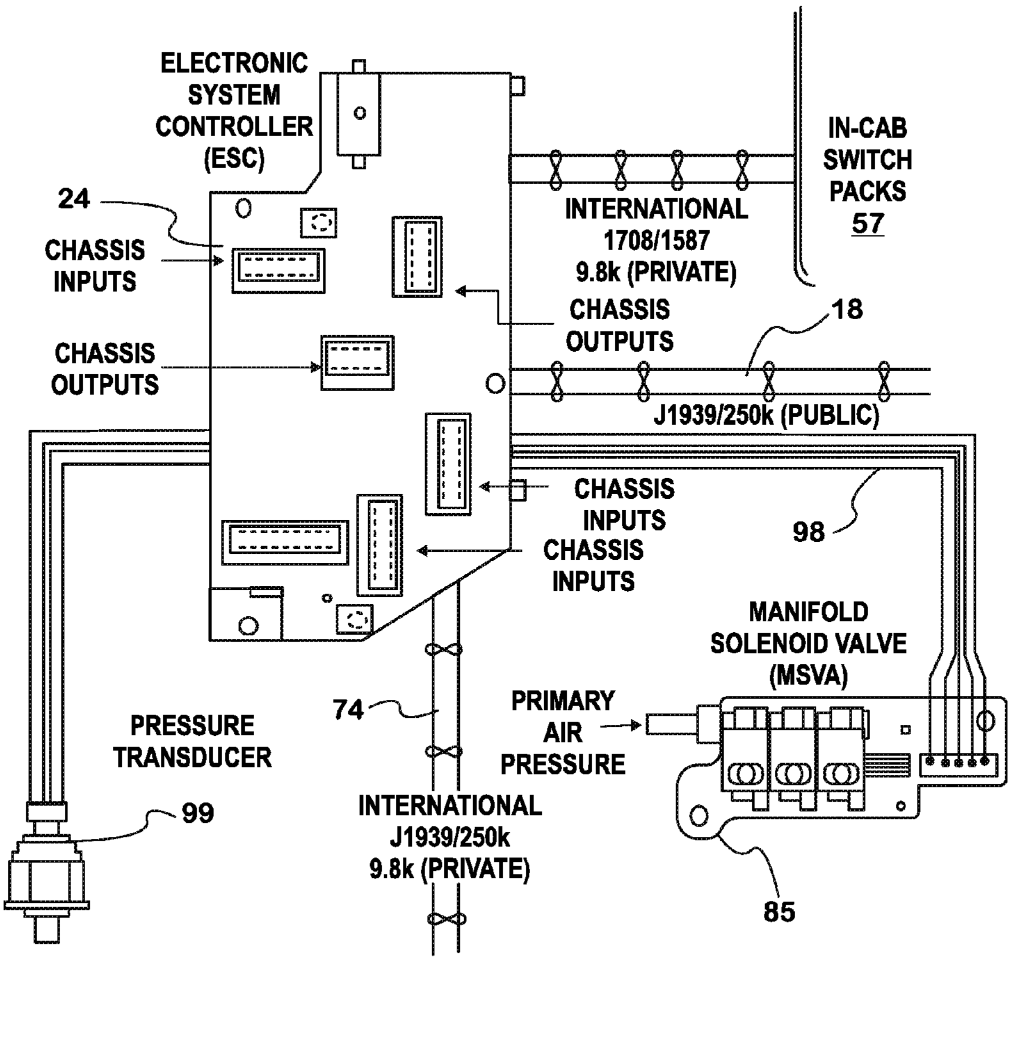
FIG. 7 is a map of input and output locations for the electrical system controller of FIG. 5.

FIGS. 5-7 illustrate a specific control arrangement and network architecture on which the state machine 300 may be implemented. Additional information regarding control systems for hybrid powertrains may be found in U.S. patent application Ser. No. 12/239,885 filed on Sep. 29, 2008 and entitled "Hybrid Electric Vehicle Traction Motor Driven Power take off Control System" which is assigned to the assignee of the present application and which is fully incorporated herein by reference, as well as U.S. patent application Ser. No. 12/508,737 filed on Jul. 24, 2009, which is assigned to the assignee of the present application and which is fully incorporated herein by reference. The arrangement also provides control over a secondary pneumatic power take-off operation 87 to illustrate that conventional PTO may be mixed with EPTO on a vehicle. Electrical system controller 24 controls the secondary pneumatic PTO 87 using a multiple solenoid valve assembly 85. Available air pressure may dictate control responses and accordingly an air pressure transducer 99 is connected to provide air pressure readings directly as inputs to the electrical system controller 24. Alternatively, EPTO could be implemented using the pneumatic system if the traction motor PTO were an air pump.

The J1939 compliant cable 74 connecting ESC 24 to RPM 40 is a twisted pair of cables. RPM 40 is shown with 6 hardwire inputs (A-F) and one output. A twisted pair cable 64 conforming to the SAE J1708 standard connects ESC 24 to an inlay 64 for the cab dash panel on which various control switches are mounted. The public J1939 twisted pair cable 18 connects ESC 24 to the gauge controller 58, the hybrid controller 48 and the transmission controller 42. The transmission controller 42 is provided with a private connection to the cab mounted transmission control console 72. A connection between the hybrid controller 48 and the console 72 is omitted in this configuration though it may be provided in some contexts.

FIG. 6 illustrates in detail the input and output pin usage for RPM 40 for a specific application. Input pin A is the Hybrid Electric Vehicle demand circuit 1 input which can be a 12-volt DC or ground signal. When active, the traction motor runs continuously. Input pin B is the Hybrid Electric Vehicle demand circuit 2 input which can be a 12-volt DC or ground signal. When active, the traction motor runs continuously. Input pin C is the Hybrid Electric Vehicle demand circuit 3 input which can be a 12-volt DC or ground signal. When the signal is active, the traction motor runs continuously. Input pin D is the Hybrid Electric Vehicle demand circuit 4 input which can be a 12-volt DC or ground signal. When the signal is active, the traction motor runs continuously. In other words the designer can provide four remote locations for switches from which an operator can initiate a PTO body power demand signal to operate the traction motor. Input pin E is a hybrid electric vehicle remote PTO disable input. The signal can be either 12 volts DC or ground. When active, PTO is disabled. Input pin F is the hybrid electric vehicle EPTO engaged feedback signal. This signal is a ground signal originating with a PTO mounted pressure or ball detent feedback switch. The output pin carries the actual power demand signal. As noted, this may be subject to various interlocks. In the example, the interlock conditions are that measured vehicle speed be less than 3 miles per hour, the gear setting be neutral and the park brake set.

FIG. 7 illustrates the location of chassis output pins and chassis input pins on the electrical system controller 24.

The system described here provides a secondary mechanism for controlling the hybrid electric motor and generator through the use of various original equipment manufacturer (OEM) chassis inputs, circumventing the TEMs' input (demand) signal sourcing devices (e.g. the RPM 40). Initiating this mode of operation can be made as simple as desired by use of a single in-cab mounted switch, which may be located in the switch pack 56, or which may be made more complex and less obvious by using a sequence of control inputs to operate as a "code." For example, with the vehicle in EPTO mode, the service brake could be depressed and held and the high beams flashed on and off twice. Once the service brake is released, subsequent activations of the high beams could generate a signal for toggling the traction motor's operation. In any event, when the traction motor is under the control of "chassis initiated" inputs, TEM input states are ignored or circumvented.

Figure 8:
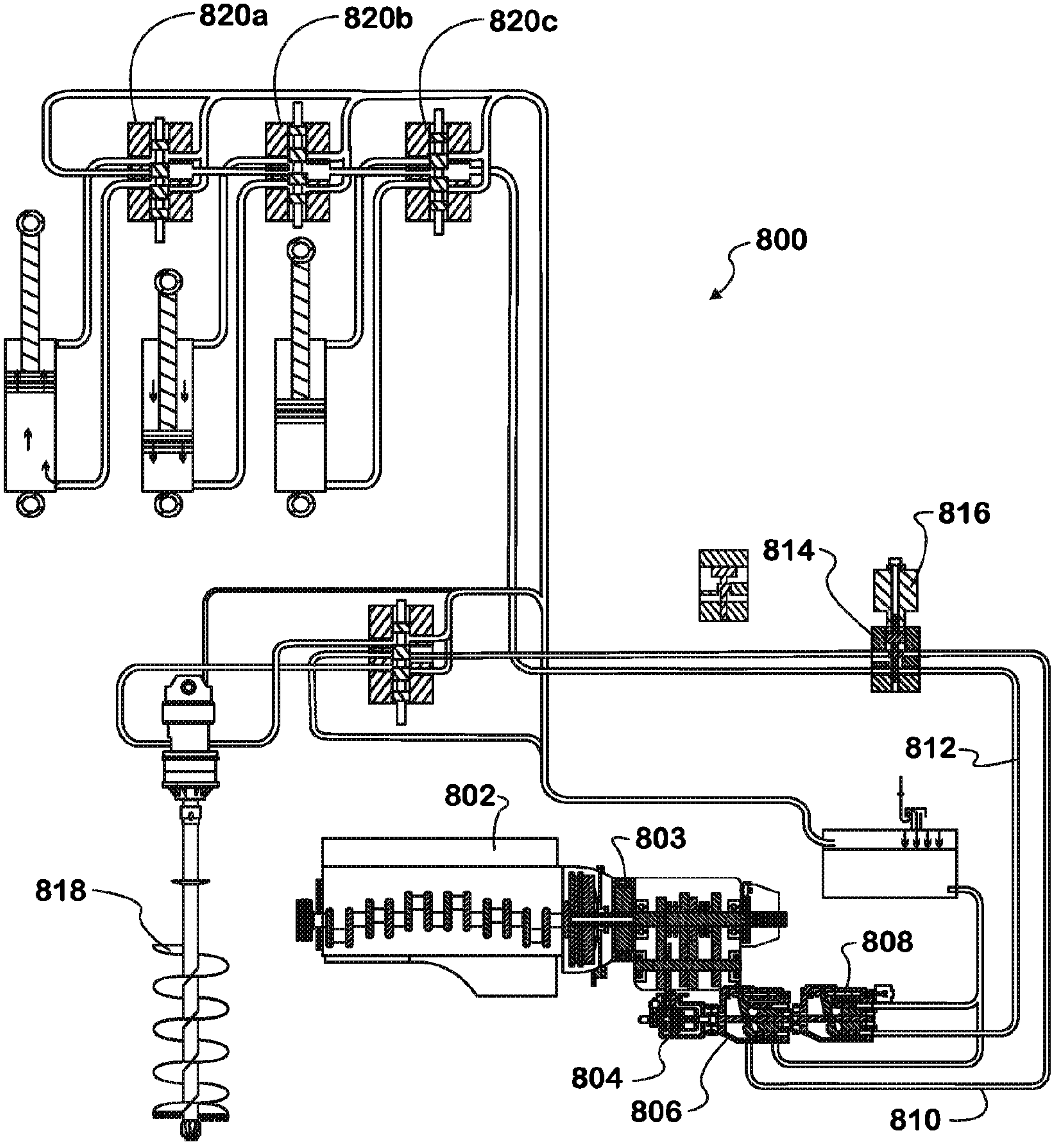
FIG. 8 is a schematic view of a vehicle having a hybrid-electric powertrain with a PTO driven hydraulic system and an electronically controlled combination valve.

Turning now to FIG. 8, a hybrid-electric powertrain with a PTO driven hydraulic system 800 is shown. The hybrid-electric powertrain with a PTO driven hydraulic system 800 comprises an internal combustion engine 802, an electric motor and generator 803, a PTO 804, and a first hydraulic pump 806 and a second hydraulic pump 808. The PTO 804 is adapted to receive power from either the internal combustion engine 802 or the electric motor and generator 803. The PTO 804 drives the first hydraulic pump 806 and the second hydraulic pump 808.

As shown in FIG. 8, the first hydraulic pump 806 is a fixed displacement hydraulic pump, such as a vane pump, while the second hydraulic pump 808 is a variable displacement hydraulic pump, such as a piston pump. The first hydraulic pump 806 provides hydraulic fluid to a first hydraulic circuit 810, while the second hydraulic pump provides hydraulic fluid to a second circuit 812.

It is contemplated that the internal combustion engine 802 may be utilized to drive the PTO 804 to power the first hydraulic pump 806, while the electric motor and generator 803 is typically utilized to power the second hydraulic pump 808. The use of the first hydraulic pump 806 or the second hydraulic pump 808 often depends on a load level placed on a hydraulic system 805. A large hydraulic load will utilize the first hydraulic pump 806 driven by the internal combustion engine 802, while a small hydraulic load will utilize the second hydraulic pump 808 driven by the electric motor and generator 803.

It is also contemplated according to another embodiment that the first hydraulic pump 806 and the second hydraulic pump 808 are both powered by the electric motor and generator 803.

A combination valve 814 is provided in fluid communication with both the first hydraulic circuit 810 and the second hydraulic circuit 812. The combination valve 814 is activated by a solenoid 816 in communication with an electrical system 900 (FIG. 9) as will be described below. The combination valve 814 may be set to allow hydraulic fluid from the first hydraulic circuit 810 to be mixed with hydraulic fluid from the second hydraulic circuit 812. The combination valve 814 also may be set to allow hydraulic fluid from the second hydraulic circuit 812 to be mixed with hydraulic fluid from the first hydraulic circuit 810. Therefore, if additionally hydraulic fluid is required in the first hydraulic circuit 810, the combination valve 814 is activated by the solenoid 816 to allow hydraulic fluid within the second hydraulic circuit 812 to flow into the first hydraulic circuit 810. Similarly, if additionally hydraulic fluid is required in the second hydraulic circuit 812, the combination valve 814 is activated by the solenoid 816 to allow hydraulic fluid within the first hydraulic circuit 810 to flow into the second hydraulic circuit 812. As shown in FIG. 8, the combination valve 814 is set to allow hydraulic fluid to flow into the first hydraulic circuit 810 from the second hydraulic circuit 812.

As shown in FIG. 8, the first hydraulic circuit includes a hydraulically driven auger 818, while the second hydraulic circuit includes a plurality of hydraulic cylinders 820*a*, 820*b*, 820*c*. Therefore, when the combination valve 814 diverts hydraulic fluid from the second circuit 812 to the first circuit 810, additional hydraulic fluid is provided to the hydraulically driven auger 818, while less hydraulic fluid is proved to the plurality of hydraulic cylinders 820*a*-820*c*. Thus, the hydraulic auger 818 is able to perform additional work based upon the additional hydraulic fluid from the second hydraulic circuit 812.

Figure 9:
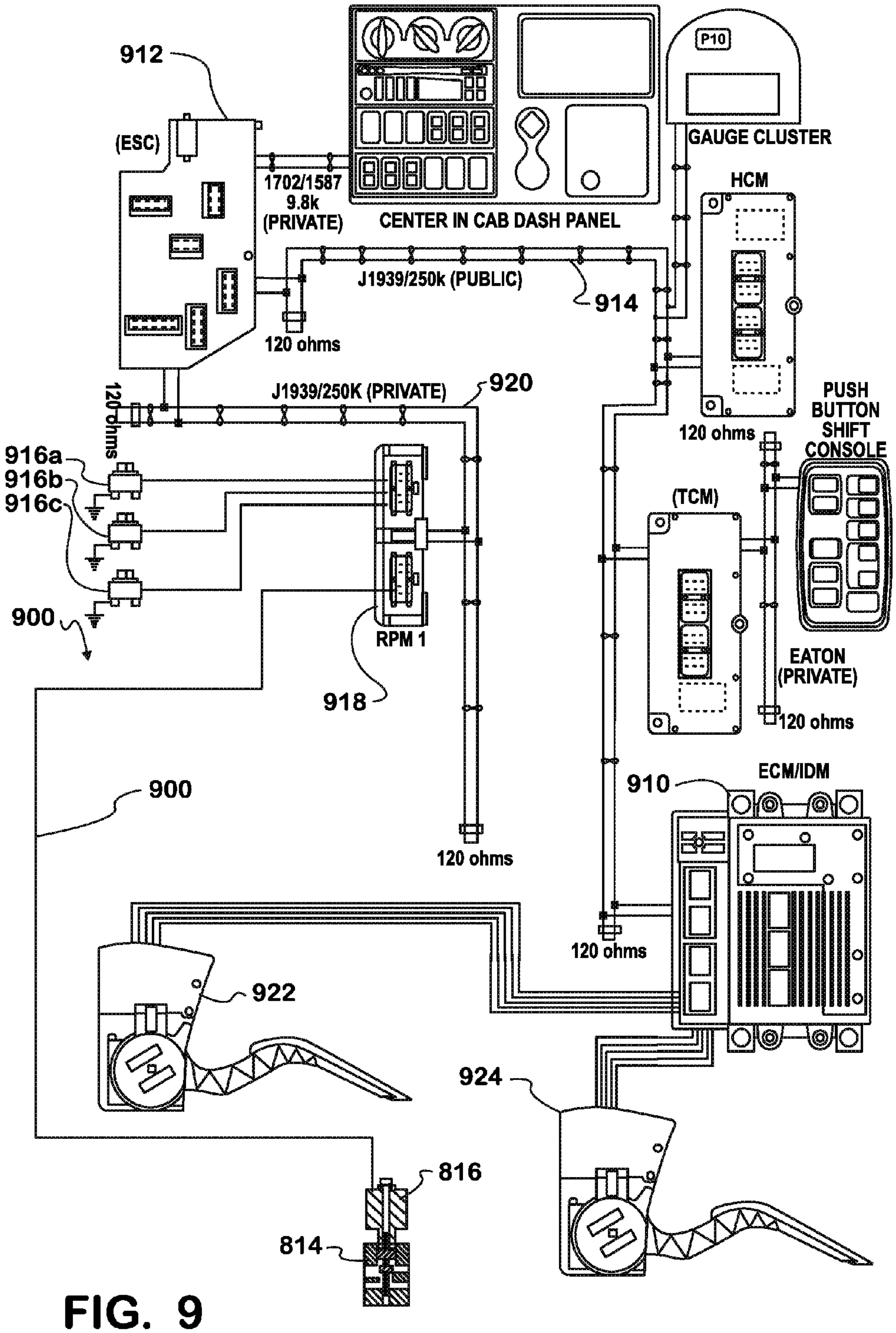
FIG. 9 is a schematic view of a control system for a vehicle having a hybrid-electric powertrain with a PTO driven hydraulic system and an electronically controlled combination valve.

Turning now to FIG. 9, a control system 900 for the hybrid-electric powertrain with a PTO driven hydraulic system 800 is depicted. The control system 900 comprises an electronic control module, or engine control module, (ECM) 910, an electronic system controller (ESC) 912. The ECM 910 and the ESC 912 are connected via a first data link 914 such that communications between the ECM 910 and the ESC 912 are possible. The ECM 910 monitors torque output of the engine 802, and the torque output of the electric motor and generator 803.

The ESC 912 monitors an estimated torque demand of the first hydraulic circuit 810 and the second hydraulic circuit 812. The estimated torque demand of the first hydraulic circuit 810 and the second hydraulic circuit 812 may be based upon positioning of controllers 916*a*, 916*b*, 916*c* that may, for example, control the auger 818, or the hydraulic cylinders 820*a*-820*c* of the hybrid-electric powertrain with a PTO driven hydraulic system 800 of FIG. 8. The controllers 916*a*-916*c* are connected to a remote power module (RPM) 918 of the control system 900. The RPM 918 is connected to the ESC 912 via a second data link 920. The ESC 912 additionally monitors flow of hydraulic fluid through the combination valve 814 as well as the position of the solenoid 816 of the combination valve 814. The combination valve 814 and the solenoid 816 are also connected to the RPM 918.

The ESC 912 contains programming adapted to control the operation of the combination valve 814 via the solenoid 816. The ESC 912 monitors the torque demand of the hydraulic circuits 810, 812 to determine if the torque demands are above a first predefined set point. Once the torque demand of either of the hydraulic circuits exceeds the predefined set point, the solenoid 816 of the combination valve 814 is activated to divert hydraulic fluid from one of the hydraulic circuit 810, 812 to the other hydraulic circuit 812, 810 through the combination valve 814. For instance, as shown in FIG. 8, the combination valve 814 is set to divert hydraulic fluid from the second hydraulic circuit 812 to the first hydraulic circuit 810.

The ESC 912 monitors the torque demands of the hydraulic circuits 810, 812, as well as the torque out put of the engine 802 and the electric motor and generator 803. The ESC 912 is programmed to stop diverting hydraulic fluid through the combination valve 814 only when the torque demand of the hydraulic circuit 810, 812 is below a second predefined set point.

It is contemplated that the second predefined set point is lower than the first predefined set point. By having the second predefined set point lower than the first predefined set point, a "dead band" is created to avoid rapid transitions of the solenoid valve 816 of the combination valve 814. This "dead band," the difference between the first set point and the second set point, produces a more stable control of the combination valve 814, particularly during transient operations of the hybrid-electric powertrain with a PTO driven hydraulic system 800.

The ESC 912 may additionally utilize inputs from an in-cab throttle pedal 922 or a remote throttle 924 as well as the controllers 916*a*-916*c* to generate an anticipated torque demand of the hydraulic circuits 810, 812. The anticipated torque demand is generated in the range of from about 100 ms to about 2000 ms in advance of the torque demand within the hydraulic circuits 810, 812 actually increasing. This anticipated torque demand of the hydraulic circuits 810, 812 allows the combination valve 814 to be activated slightly sooner, reducing any performance lag caused when the required torque of the hydraulic circuit 810, 812 exceeds the torque generated by the hydraulic pumps 806, 808 of the hybrid-electric powertrain with a PTO driven hydraulic system 800.

It is contemplated that the RPM 918 may control the solenoid 816 of the combination valve in a variety of manners. According to one embodiment, the RPM 918 provides a signal that moves the solenoid 816 from a first position, where the combination valve 814 is closed, to a second position where the combination valve 814 diverts hydraulic fluid to the first hydraulic circuit 810, or to a third position where the combination valve 814 diverts hydraulic fluid to the second hydraulic circuit 812. It is additionally contemplated that the RPM 918 may control the solenoid using pulse width modulation, such that combination valve 814 may be adjusted incrementally to provide just the required fluid to the first hydraulic circuit 810 or the second hydraulic circuit 812. It is further contemplated that the RPM 918 may control the solenoid using current control, such that combination valve 814 may be adjusted incrementally to provide just the required fluid to the first hydraulic circuit 810 or the second hydraulic circuit 812.

The first predefined set point and the second predefined set point of the ESC 912 may be preprogrammed, or may be set by an adaptive learning strategy. An adaptive learning strategy to generate the first and second set points of the ESC 912 utilizes an algorithm that monitors the torque demands of the hydraulic circuits 810, 812, as well as the torque out put of the engine 802 and the electric motor and generator 803, and adjusts the first and second set point based upon the monitored parameters over a period of time. In this manner, the set point where the combination valve 814 is activated becomes very near to a point where the actual torque demand and the actual torque output match, and similarly the second set point becomes very near to a point where the torque demand is not likely to exceed the actual torque output. Such an adaptive learning strategy may be useful in an application where operating conditions remain similar over time.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a computer-readable medium can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A vehicle having a hybrid-electric powertrain comprising:

an internal combustion engine;

an electric motor and generator connected to the internal combustion engine;

a power take off unit selectively driven by the electric motor and generator;

a first hydraulic circuit having a first hydraulic pump being mechanically connected to the power take off unit and being driven by the power take off unit;

a second hydraulic circuit having a second hydraulic pump being mechanically connected to the power take off unit and being driven by the power take off unit;

a combination valve disposed in fluid communication with the first hydraulic circuit and the second hydraulic circuit, the combination valve having a first open position adapted to allow fluid to flow from the second hydraulic circuit to the first hydraulic circuit and a closed position adapted to prevent fluid flow from the first hydraulic circuit to the second hydraulic circuit;

a solenoid connected to the combination valve, the solenoid positioning the combination valve between the first open position and the closed position;

an electronic system controller in electrical communication with the solenoid, the electronic system controller generating a control output to the solenoid to position the combination valve;

wherein the electronic system controller monitors a torque requirement of the first hydraulic circuit and a torque requirement of the second hydraulic circuit and generates a control output to position the combination valve in the first open position when the torque requirement of the first hydraulic circuit exceeds a first set point, and generates a control output to position the combination valve in the closed position when the torque requirement of the first hydraulic circuit falls below a second set point, the first set point and the second set point being based on an adaptive learning strategy, the electronic system controller further utilizing a throttle input to generate an anticipated torque demand and adjustinq the control output in response to the anticipated torque demand, the torque requirement of the first hydraulic circuit, and the torque requirement of the second hydraulic circuit.

2. The vehicle having a hybrid-electric powertrain of claim 1, wherein the combination valve has a second open position adapted to allow fluid flow from the first hydraulic circuit to the second hydraulic circuit.

3. The vehicle having a hybrid-electric powertrain of claim 1, further comprising an electronic control module, the electronic control module being disposed in electrical communication with the electronic system controller, the electronic control module adapted to monitor torque output of the electric motor and generator and the internal combustion engine, wherein the first set point and the second set point are based in part upon the torque output of the electric motor and generator and the internal combustion engine.

4. The vehicle having a hybrid-electric powertrain of claim 1, wherein the first hydraulic pump is a fixed displacement type pump.

5. The vehicle having a hybrid-electric powertrain of claim 1, wherein the second hydraulic pump is a piston type pump.

6. The vehicle having a hybrid-electric powertrain of claim 1, wherein the power take off unit is selectively driven by the internal combustion engine.

7. A method of controlling a position of a combination valve of a hydraulic system having a first hydraulic circuit and a second hydraulic circuit comprising:

monitoring torque requirement of a first hydraulically driven device connected to a first hydraulic circuit of a hydraulic system;

monitoring torque generated by at least one power source connected to a hydraulic pump of the first hydraulic circuit;

utilizing a throttle input to generate an anticipated torque demand;

determining if the torque requirement of the hydraulically driven device exceeds a first predetermined set point based upon torque generated by the at least one power source connected to the hydraulic pump of the first hydraulic circuit, upon the anticipated torque demand, and upon an adaptive learning strategy; and positioning a combination valve to a first open position allowing hydraulic fluid to flow from a second hydraulic circuit to the first hydraulic circuit when the torque requirement of the hydraulically driven device and the anticipated torque demand exceeds the first predetermined set point.

8. The method of claim 7, further comprising:

determining if the torque requirement of the hydraulically driven device is below a second predetermined set point based upon torque generated by the at least one power source connected to the hydraulic pump of the first hydraulic circuit, upon the anticipated torque demand, and upon the adaptive learning strategy; and positioning a combination valve to a closed position preventing hydraulic fluid from flowing from the second hydraulic circuit to the first hydraulic circuit when the torque requirement of the hydraulically driven device is below the second predetermined set point.

9. The method of claim 8, wherein the second predetermined set point is lower than the first predetermined set point.

10. The method of claim 7, further comprising:

monitoring torque requirement of a second hydraulically driven device connected to a second hydraulic circuit of a hydraulic system;

monitoring torque generated by at least one power source connected to a hydraulic pump of the second hydraulic circuit;

determining if the torque requirement of the second hydraulically driven device is below a third predetermined set point based upon torque generated by the at least one power source connected to the hydraulic pump of the second hydraulic circuit, upon the anticipated torque demand, and upon the adaptive learning strategy; and positioning a combination valve to a first open position allowing hydraulic fluid to flow from a second hydraulic circuit to the first hydraulic circuit when the torque requirement of the first hydraulically driven device and the anticipated torque demand exceeds the first predetermined set point and the torque requirement of the second hydraulically driven device falls below the third predetermined set point.

11. A control system for a combination valve for a hydraulic system of a vehicle having a hybrid-electric powertrain comprising:

an electronic control module adapted to monitor torque output of an internal combustion engine and an electric motor and generator;

an electronic system controller disposed in electrical communication with the electronic control module, the electronic system controller adapted to monitor torque demand of a first hydraulic circuit of a hydraulic system and a second hydraulic circuit of the hydraulic system, the electronic controller further adapted to utilize a throttle input to generate an anticipated torque demand;

a remote power module disposed in electrical communication with the electronic system controller;

a solenoid valve disposed in electrical communication with the remote power module, the solenoid valve connected to a combination valve, the solenoid valve having a first open position and a closed position, the combination valve being disposed in fluid communication with a first hydraulic circuit and a second hydraulic circuit;

wherein the solenoid valve is moved to the first open position in response to an output signal from the electronic system controller when the difference between the torque output and the torque demand of the first hydraulic circuit added to the anticipated torque demand reaches a first predetermined set point.

12. The control system for a combination valve for a hydraulic system of a vehicle having a hybrid-electric powertrain of claim 11, wherein the solenoid valve is moved to the closed position in response to an output signal from the electronic system controller when the difference between the torque output and the torque demand added to the anticipated torque demand exceeds a second predetermined set point.

13. The control system for a combination valve for a hydraulic system of a vehicle having a hybrid-electric powertrain of claim 11, wherein the torque demand of the first hydraulic circuit is based upon input from a controller in electrical communication with the remote power module.

14. The control system for a combination valve for a hydraulic system of a vehicle having a hybrid-electric powertrain of claim 11, wherein the solenoid valve has a second open position; and the solenoid valve is moved to the second open position in response to an output signal from the electronic system controller when the difference between the torque output and the torque demand of the second hydraulic circuit reaches a third predetermined set point.

15. The control system for a combination valve for a hydraulic system of a vehicle having a hybrid-electric powertrain of claim 14, wherein the solenoid valve is moved to the closed position in response to an output signal from the electronic system controller when the difference between the torque output and the torque demand of the second hydraulic circuit exceeds a second predetermined set point.

16. The control system for a combination valve for a hydraulic system of a vehicle having a hybrid-electric powertrain of claim 11, wherein the torque output is based upon a position of a throttle in electrical communication with the electronic control module.

17. The control system for a combination valve for a hydraulic system of a vehicle having a hybrid-electric powertrain of claim 11, wherein the solenoid valve is a proportional valve.

* * * * *